Aug. 16, 1932. J. V. BREISKY 1,872,560
ELECTRICAL PROTECTIVE SYSTEM
Filed Aug. 23, 1926 7 Sheets-Sheet 1

WITNESSES:

INVENTOR
John V. Breisky.
BY
ATTORNEY

Aug. 16, 1932.  J. V. BREISKY  1,872,560
ELECTRICAL PROTECTIVE SYSTEM
Filed Aug. 23, 1926   7 Sheets-Sheet 2

WITNESSES:

INVENTOR
John V. Breisky.
BY
ATTORNEY

Aug. 16, 1932.   J. V. BREISKY   1,872,560
ELECTRICAL PROTECTIVE SYSTEM
Filed Aug. 23, 1926   7 Sheets-Sheet 3

WITNESSES:

INVENTOR
John V. Breisky.
BY
ATTORNEY

Aug. 16, 1932.  J. V. BREISKY  1,872,560
ELECTRICAL PROTECTIVE SYSTEM
Filed Aug. 23, 1926  7 Sheets-Sheet 5

WITNESSES:

INVENTOR
John V. Breisky.
BY
ATTORNEY

Patented Aug. 16, 1932

1,872,560

UNITED STATES PATENT OFFICE

JOHN V. BREISKY, OF PITTSBURGH, PENNSYLVANIA, ASSIGNOR TO WESTINGHOUSE ELECTRIC & MANUFACTURING COMPANY, A CORPORATION OF PENNSYLVANIA

ELECTRICAL PROTECTIVE SYSTEM

Application filed August 23, 1926. Serial No. 130,821.

My invention relates to protective systems for electrical circuits and particularly to systems embodying electro-ionic or thermionic relays.

An object of my invention is to provide a protective system embodying an electro-ionic relay and means associated therewith to vary the time-element characteristics and the sensitivity of the relay as desired.

A further object of my invention is to provide actuating means for a circuit-interrupter including an electro-ionic relay having variable time-element and operating-current characteristics which may be adjusted independently of each other.

A further object of my invention is to provide means associated with one of the circuits of an electro-ionic tube for obtaining the desired time-element characteristics in the operation of the tube.

A further object of my invention is to provide protective systems embodying an electro-ionic device and operating in accordance with current, reverse-current, voltage, power, impedance or differential quantities either instantaneously or with a time element.

In accordance with my invention, an electro-ionic tube such as an evacuated or gas-filled thermionic tube of the hot-cathode type is so connected to an electrical circuit as to be responsive to predetermined electrical conditions therein. A device such as a circuit-interrupter is controlled by the current through the tube. For example, upon an increase of current through the tube, a tripping coil of the circuit-interrupter may be operatively energized to actuate the circuit-interrupter and open the circuit to which the electro-ionic tube is connected.

In electrical systems, it is necessary to control the circuit upon the occurrence of predetermined variations in current, voltage or both or functions of these quantities such as symmetrical components or upon the occurrence of an unbalance in these quantities between two points in the system. In accordance with my invention, an electro-ionic tube may be arranged to be responsive to any of these abnormal electrical conditions for the purpose of protecting the system. Obviously, the invention is not limited to protective systems, in its broader aspects, but it is of especial importance in such systems and accordingly such applications will be described herein.

It is desirable to be able to vary the time-element characteristics of the circuit-interrupter in many applications, for example, in electrical distribution systems where a number of circuit-interrupters are employed. In such systems it is often possible to retain a considerable portion of the system in service after the occurrence of a fault by selectively operating the circuit-interrupters nearest the point of fault. This may be accomplished, for example, by providing the circuit-interrupters nearest the stations or generators with a longer time element than the remote circuit-interrupters so that if the fault is remote from the station only a portion of the distribution system will be disconnected instead of the entire system being disconnected at the station.

In accordance with my invention, the desired time-element and current characteristics are obtained by connecting a variable resistor in one or more of the circuits of the electro-ionic relay. Preferably the resistor has a large temperature-coefficient of resistance so that as the resistor becomes heated, its change in specific resistance permits the electro-ionic tube to become operative.

In accordance with the preferred form of my invention, suitable means, such as a heater winding for the resistor, is also provided to predetermine the time-element characteristics of the electro-ionic tube. In this case the adjustable resistor is arranged to vary only the operating current required or, in other words, the sensitiveness of the protective system. The heater coil may also be variable in order to permit the time-element characteristic of the relay to be adjusted as desired.

If a heater winding is employed in connection with the resistor, the heating effect of the current traversing the resistor is preferably made negligible. If no heater winding is employed, the resistor is so proportioned as to be heated by the current traversing the same. Other methods of varying the specific resistance of the controlling resistor may be employed, if desired.

The detailed operation of my invention, together with other objects and advantages thereof, will become clear from a consideration of the following detailed description of specific embodiments thereof shown upon the accompanying drawings.

Figure 1:
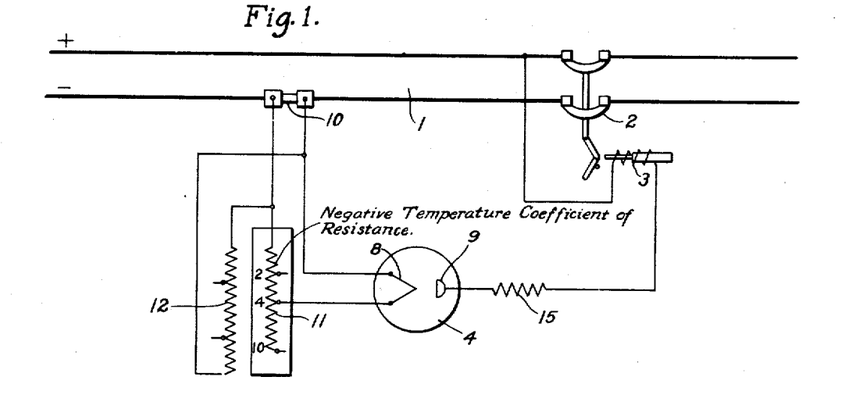
Fig. 1 is a diagrammatic view of a direct-current overload circuit-interrupting system embodying my invention.

Referring to Fig. 1, an electrical circuit 1 is shown having a circuit-interrupter 2 therein provided with a tripping coil 3 which is controlled by an electro-ionic tube 4 connected to the circuit. It is assumed, in the present instance, that it is desired to trip the circuit-interrupter 2 and thereby open the circuit upon the occurrence of a predetermined abnormal electrical condition on the circuit, such as an overload, although the invention is applicable to other systems and to the control of various types of electro-responsive devices. It is assumed, therefore, that a direct-current source (not shown) is connected to the circuit 1, for example, at the left-hand side of the said circuit and that a load (not shown) is also connected to the circuit 1, for example, to the right-hand end of the circuit. The electro-ionic tube 4 comprises a filamentary cathode 8 and an anode 9 in a suitable envelope which may be exhausted to a high vacuum or filled with an inert gas, such as neon or argon, at a predetermined pressure. Other types of electro-ionic devices may be employed, a thermionic or hot-cathode tube being shown by way of example.

The filamentary cathode 8 of the electro-ionic tube 4 is connected to the terminals of a shunt 10 in the circuit 1 in series with a variable resistor 11 having a relatively large negative temperature-coefficient of resistance. A heater 12 is also connected to the terminals of the shunt 10 and disposed in intimate relation to the variable resistor 11 in order to raise the temperature thereof to a predetermined value when an excessive current traverses the shunt 10. The resistor 11 and the heater 12 are both provided with taps, as indicated, in order to permit the characteristics of the electro-ionic tube 4 to be varied as desired.

The amount of resistance 11 connected in series with the cathode 8 determines the operating current required to heat the cathode to the electron-emitting temperature whereas the amount of the heater coil 12 included across the terminals of the shunt determines the rate at which the resistor 11 is heated to such a temperature that the electro-ionic tube 4 becomes operative, or the time element of the system, if the resistor is so proportioned that it is not heated appreciably by the direct-current traversing it.

The tripping coil 3 of the circuit-interrupter 2 is connected between the positive conductor of the circuit 1 and the anode 9. The filamentary cathode 8 of the electro-ionic tube 4 is connected to the negative terminal of the circuit 1 in order to complete the circuit of the tripping coil 3. A resistor 15 may be connected in series with the tripping coil 3 to limit the current traversing the electro-ionic tube and tripping coil, depending upon the potential of the circuit 1.

When the current in the circuit 1 exceeds a predetermined value, sufficient current traverses the heater coil 12 to heat the resistor 11 to the operating temperature. When the resistor 11 reaches such a temperature that its specific resistance is sufficiently low, the current traversing the resistor 11 and the cathode 8 of the electro-ionic tube 4 will be increased and the cathode will reach the electron-emitting temperature. The heater 12 may be omitted, in some instances, if the resistor 11 is so proportioned that it will be heated by the current traversing it.

After the cathode reaches the electron-emitting temperature, a current traverses the electro-ionic tube 4, thereby operatively energizing the tripping coil 3 and opening the circuit-interrupter 2. As stated above, varying the resistance of the heater coil 12 changes the time-element in the operation of the circuit-interrupter, whereas varying the resistor 11 changes the minimum operating value of current required to trip the circuit-interrupter. These adjustments are absolutely essential in systems where the circuit-interrupters must be selectively operated in accordance with some particular requirement.

My invention may be applied to either direct-current or alternating-current circuits and may be arranged to operate in response to various electrical conditions, some of which are illustrated in the other figures of the drawings. For example, in Fig. 2 I have shown means embodying my invention for tripping the circuit-interrupter 2 upon the occurrence of a drop in voltage upon the circuit 1. In this instance, the filamentary cathode 8 of the electro-ionic tube 4 is connected to the negative conductor of the circuit 1 and is heated by a source of current 16 of constant potential in series with a resistor 17 having a relatively large positive temperature-coefficient of resistance. The heater coil 12, in this instance, is connected across the circuit 1 in series with a limiting resistor 18. As long as the voltage of the circuit is normal, the heater 12 maintains the resistor 17 at such a high temperature that the specific resistance thereof is high and the cathode 8 does not reach the electron-emitting temperature. In case the voltage of the circuit 1 drops, however, the heater 12 and the resistor 17 become cooled to a lower temperature and the increased current through the cathode 8 heats the cathode to the electron-emitting temperature, whereupon a current traverses the electro-ionic tube 4 and the tripping coil 3 to open the circuit-interrupter 2.

Figure 2:
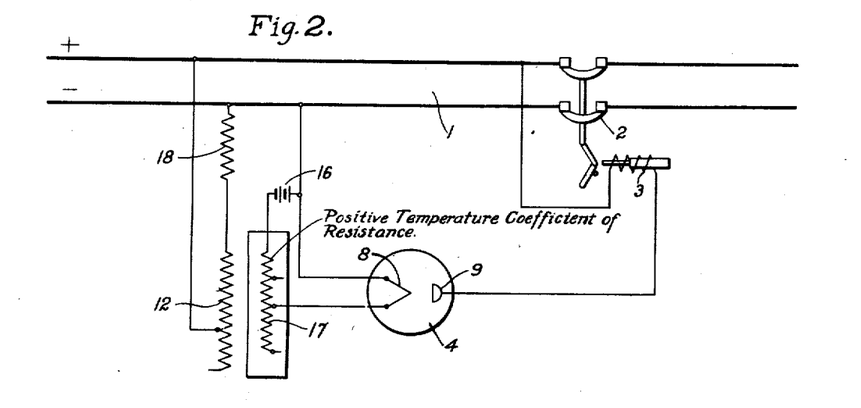
Fig. 2 is a similar view of the direct-current under-voltage system embodying my invention.
Figure 3:
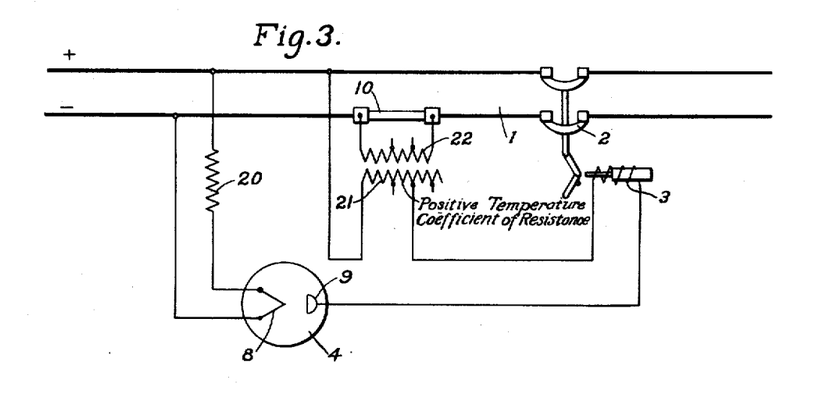
Fig. 3 is a similar view of a direct-current under-load system embodying my invention.

In Fig. 3 I have shown a direct-current under-load circuit-interrupter system comprising substantially the same elements as those shown in Figs. 1 and 2, except that the thermal-responsive element for controlling the electro-ionic tube is connected in the anode circuit of the tube. The filamentary cathode 8 of the electro-ionic tube 4 is connected across the circuit 1 in series with a limiting resistor 20. The anode circuit of the electro-ionic tube 4 includes the cathode 8, the anode 9, the tripping coil 3 of the circuit-interrupter and a variable resistor 21 having a relatively large positive temperature-coefficient of resistance. A heater 22 is connected across the terminals of the shunt 10 and is arranged to control the temperature of the resistor 21 in accordance with the current traversing the circuit 1. As long as the current traversing the circuit 1 exceeds a predetermined value, the temperature of the resistor 21 and the heater 22 are so high that insufficient current traverses the tripping coil 3 to trip the circuit-interrupter. However, if the current traversing the circuit decreases sufficiently, the resistors 21 and 22 are cooled off and the cooling of the resistor 21 decreases the resistance thereof to such an extent that the tripping coil 3 in series relation thereto is operatively energized. Obviously, the arrangement shown could be used as an over-load protective system if the resistor 21 had a negative temperature-coefficient of resistance.

Figure 4:
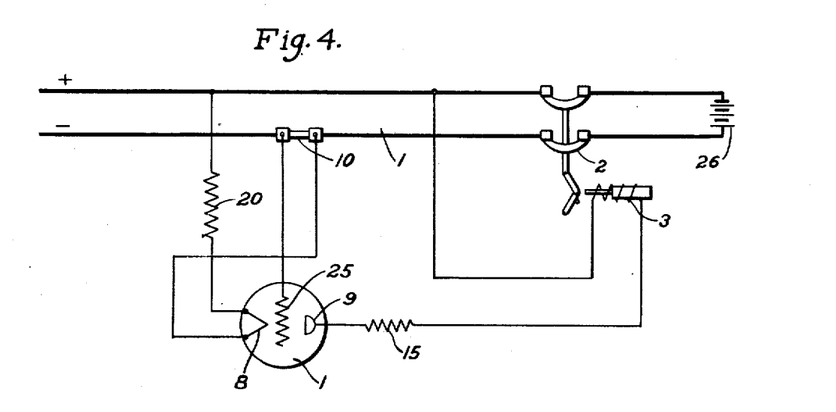
Fig. 4 is a similar view of a direct-current reverse-energy system embodying my invention.

In Fig. 4 I have shown a further modification which is responsive to the reversal of energy of a direct-current circuit. The elements of the system are substantially the same as shown in the preceding figures, except that the electro-ionic tube 4 comprises in addition to the cathode 8 and anode 9, a control or grid electrode 25 which is connected to one of the terminals of the shunt 10 in the circuit 1. The other terminal of the shunt is connected to the cathode 8 which is also bridged across the circuit in series with a resistor 20.

This circuit may be used, for example, in charging a storage battery 26 if it is desired that the circuit-interrupter 2 shall open if energy is fed from the battery 26 to the supply circuit 1, as will be the case if the supply source fails.

Normally, the potential drop through the shunt 10 is in such a direction as to maintain the potential on the grid electrode 25 negative with respect to that of the cathode 8. If, however, the direction of current in the circuit reverses, the potential of the grid electrode 25 becomes positive with respect to the cathode and a current traverses the anode circuit of the electro-ionic tube including the trip coil 3, thereby opening the circuit.

Figure 5:
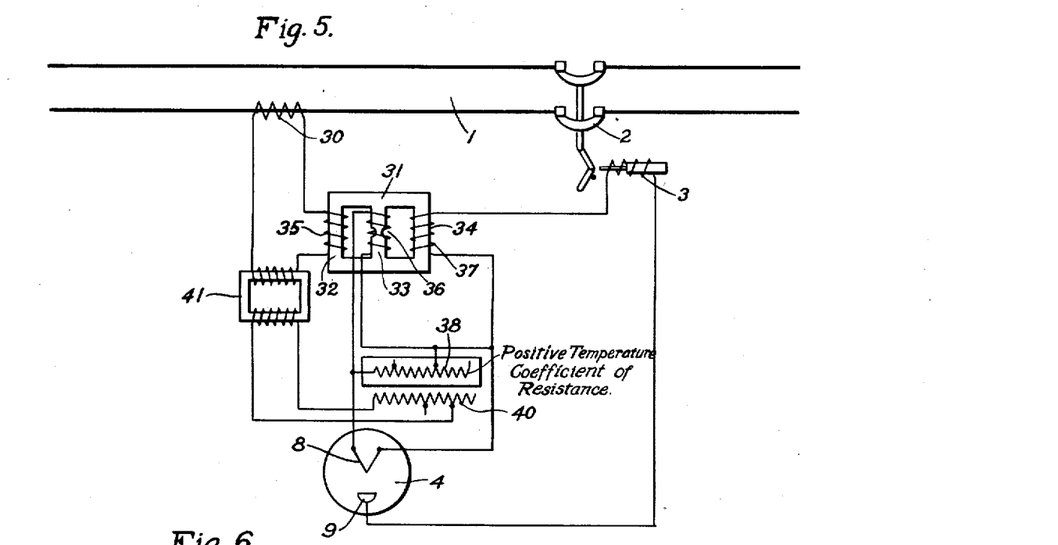
Fig. 5 is a similar view of an alternating-current over-load system embodying my invention.

In Fig. 5 I have shown an alternating-current over load system similar in operating characteristics to the direct-current system shown in Fig. 1. In this instance, the electro-ionic tube 4 is energized from the circuit 1 through the current transformer 30 which is substituted for the shunt 10 used in direct-current circuits. An auxiliary transformer 31 is also employed which has three parallel legs 32, 33 and 34 on which the windings 35, 36 and 37 are disposed. The winding 35 is connected across the terminals of the secondary winding of the current transformer 30. The winding 36 is connected to the terminals of the cathode. The transformer leg 33 on which the winding 36 is disposed may be so restricted in cross section, as indicated, that it becomes saturated for relatively low values of current in order to prevent the possibility of damaging the cathode 8 of the electro-ionic tube 4. The winding 37 is connected in the anode circuit of the electro-ionic tube 4 to provide a source of current for energizing the tripping coil 3 of the circuit-interrupter.

The cathode 8 is shunted by a variable resistor 38 having a high positive temperature-coefficient of resistance, in order to limit the current through the cathode 8 until its resistance has changed to a predetermined value. A heater 40 is associated with the resistor 38 and is energized through the saturable transformer 41. The saturating transformer 41 limits the rate of heating to a definite maximum value and thereby provides a definite minimum time-element in the operation of the system. The potential of the anode circuit is preferably kept constant either by saturating the leg 34 of the transformer 31 or by utilizing a separate source of potential, so that there will be no variations in anode potential to affect the operation of the tube.

Figure 6:
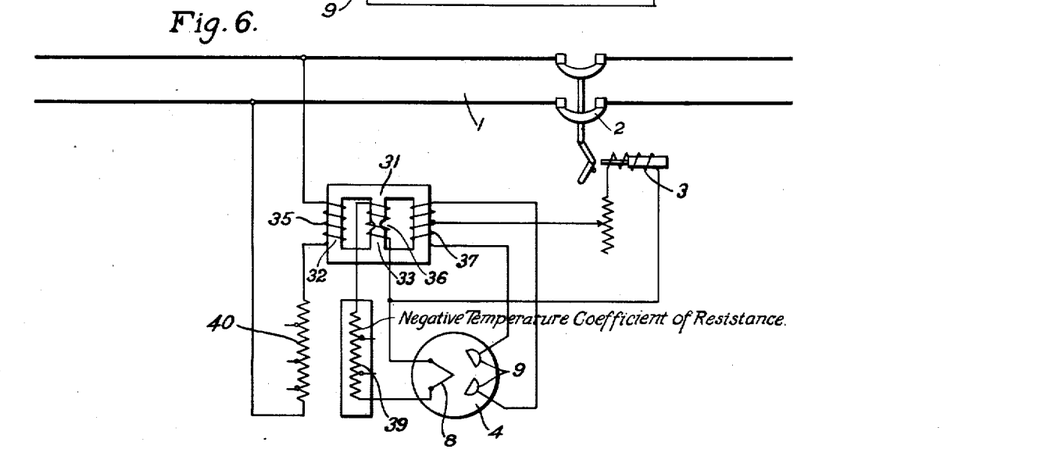
Fig. 6 is a similar view of an alternating-current over-voltage system.

In Fig. 6 I have shown a system responsive to a condition of over voltage. A resistor 39 having a relatively large negative temperature-coefficient of resistance is connected in series relation with the cathode 8 and a heater 40 associated with the resistor 39 is connected across the circuit in series relation with the winding 35 of the transformer 31. The electro-ionic tube 4 is also provided with two anodes 9 which are so connected to the winding 37 and the anode circuit as to secure full-wave rectification of the current in said circuit. When the voltage in the circuit 1 increases, the resistance of the resistor 39 decreases and the electro-ionic tube becomes operative to trip the circuit-interrupter 2.

Figure 7:
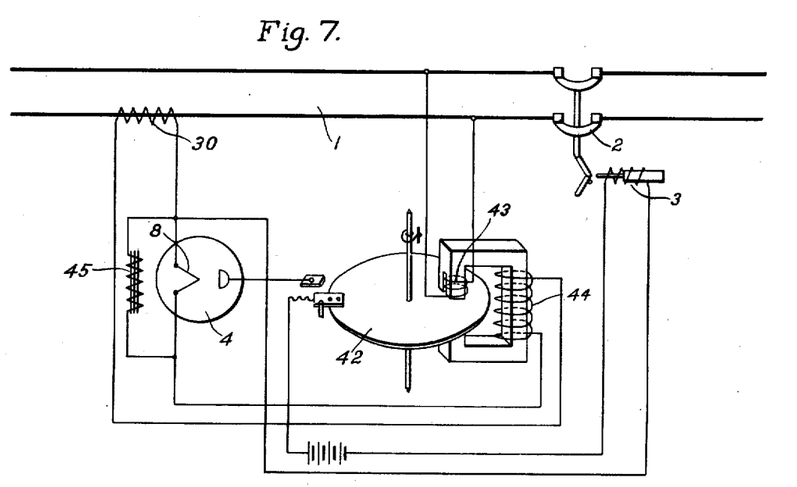
Figs. 7 and 8 are similar views of power-directional systems embodying my invention.

In Fig. 7 I have shown a further modification of the system shown in Figs. 5 and 6. In this modification a power-directional relay 42 is so associated with the electro-ionic tube 4 that the tripping coil 3 will not be energized unless the power flowing to the over load or short-circuit has a predetermined direction. The power-directional relay 42 is of the usual induction type and comprises a potential winding 43 connected across the circuit 1 and a current winding 44 connected in series with the cathode 8 of the electro-ionic device 4 across the terminals of the current transformer 30. The saturating reactor 45 is connected in shunt relation to the cathode 8 of the electro-ionic tube in order to prevent the destruction of the cathode when excessive current traverses the circuit 1.

The contact members of the directional relay 42 are connected in series with the anode circuit of the electro-ionic tube 4 and since the contact members are in engagement only when the flow of power in the circuit 1 is in a predetermined direction, the tripping of the circuit-interrupter 2 is prevented when the power flowing to the over load or short-circuit is in a predetermined direction.

Figure 8:
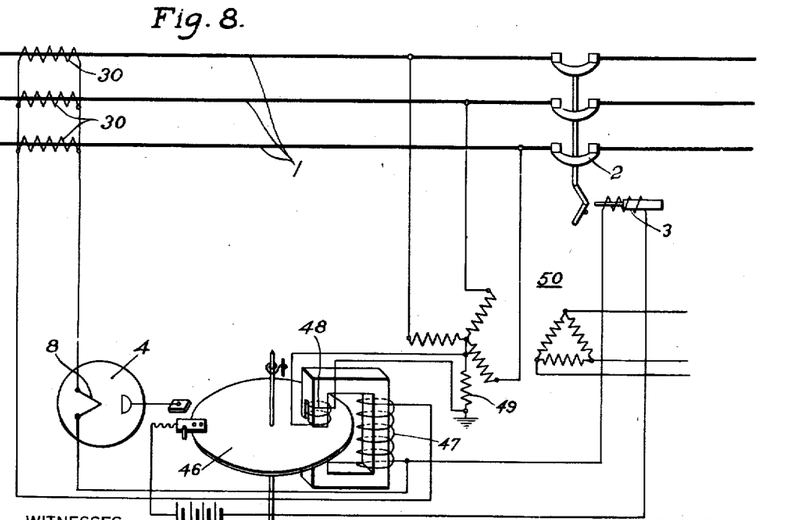

In Fig. 8 I have shown a modification of the system shown in Fig. 7 in which a directional current relay 46 similar in construction to the power-directional relay 41 in Fig. 7 is employed in connection with an electro-ionic tube 4 which is responsive only to ground or residual current. The cathode 8 of the electro-ionic tube 4 and one winding 47 of the ground relay are connected to the star-connected current transformers 30 in the three-phase circuit 1 so as to be traversed by current when a ground or residual current traverses the conductors of the circuit. The second winding 48 of the directional ground relay 46 is connected across a resistor 49 in the neutral ground connection of an auxiliary transformer 50. Since the energization of the directional ground relay 46 depends upon the phase relation of the currents and windings 47 and 48 which depend, in turn, upon the direction of the ground fault, the relay will only operate in case the flow of ground current is in a predetermined direction. The directional ground relay 46 may be instantaneous in operation and the time-element, if desired, is obtained by the use of the electro-ionic device 4, in which case the circuits of the electro-ionic tube 4 may include suitable thermal responsive devices, as shown in the preceding figures.

Figure 9:
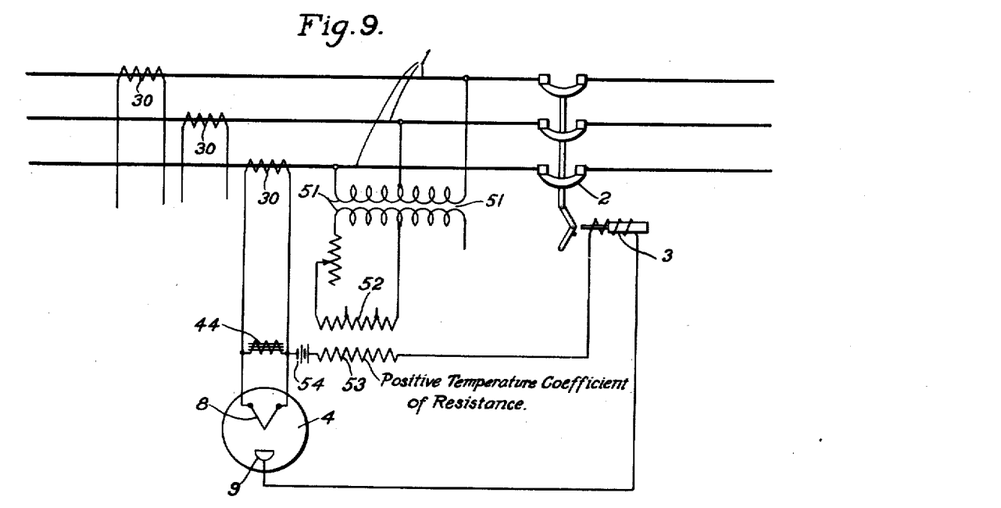
Figs. 9 to 11, inclusive, are similar views of circuit-interrupting systems operating in accordance with the impedance of the circuit between the associated circuit-interrupter and the fault.

In Fig. 9 I have shown a system in which the time element in controlling the circuit-interrupter depends upon the impedance of the current between the circuit-interrupter and the point of fault, or in other words, upon the distance to the fault. The electro-ionic tube 4 is arranged to be responsive to the current traversing the circuit and the voltage obtaining on the circuit. Since the current traversing the circuit will be less and the voltage across the circuit will be greater, the greater the distance to the fault, the electro-ionic tube 4 is arranged to have a time element that is inversely proportional to the current and directly proportional to the voltage of the circuit.

The cathode 8 of the electro-ionic tube 4 is connected across the terminals of a current transformer 30 in the circuit 1. A saturating reactor 44 may be connected in shunt relation to the cathode 8. A potential transformer 51 is connected across one phase of the circuit and to the heater 52, which is arranged to vary the time-element of the tube to obtain selective operation of the associated circuit-interrupter. A resistor 53 associated with the heater 52 and having a relatively large positive temperature-coefficient of resistance is connected in series with the tripping coil of the circuit-interrupter 2 and the anode circuit of the electro-ionic tube 4. A source of potential, such as a battery 54, is provided in the anode circuit.

The cathode 8 of the electro-ionic tube 4 becomes heated to the electron-emitting temperature when a predetermined current traverses the circuit 1. If this current is accompanied by the drop in voltage in the circuit, the heater 52 becomes cooled and the specific resistance of the resistor 53 drops until the potential of the battery 54 is sufficient to establish a current in the anode circuit and operatively energize the tripping coil 3 to open the circuit 1. It will be apparent that the lower the voltage of the circuit and the higher the current, until the reactor 44 becomes saturated, the shorter will be the time element in the operation of the circuit-interrupter.

In the case of polyphase circuits, current transformers will be provided in each phase of the circuit as indicated, and a plurality of electro-ionic tubes 4 will be required. Two V-connected potential transformers 51 will be required for complete protection of each phase of the circuit. The electro-ionic tube in each phase will be connected in the same manner as that shown and described above. If the relays are responsive to the star voltages, the system will provide ground protection.

Figure 10:
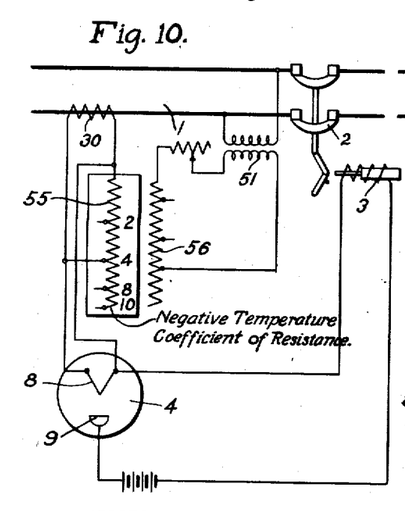
Figure 11:
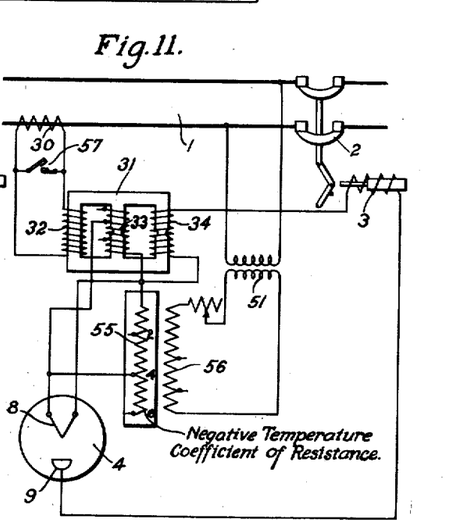

In Figs. 10 and 11 I have shown modifications of the system shown in Fig. 9 in which the time element of the electro-ionic tube 4 is controlled by resistors 55 having a relatively large negative temperature-coefficient of resistance and heaters 56 associated therewith and energized in accordance with the potential of the circuit by means of the potential transformers 51. In Fig. 10 the cathode 8 of the electro-ionic tube is connected directly to the current transformer 30, whereas in Fig. 11 an auxiliary transformer 31 similar to that shown in Figs. 5 and 6 is provided. It is believed that the operation of these systems will be obvious from a consideration of the other modifications described above.

The leg 34 of the transformer 31 is so restricted in cross-section that the anode circuit potential is substantially constant at even low circuit currents. The effect of variations in current upon the anode circuit is therefore minimized.

A switch 57 is arranged to short-circuit the current transformer 30 except when an excessive current traverses the circuit or the voltage across the circuit drops to a predetermined value. This may be accomplished by the use of over current and under voltage relays of the usual type. The advantage of this arrangement is that the tube may be adjusted to operate on less than full-load current, as the normal load current is not accompanied by a large drop in voltage, and under these conditions the current transformer is short-circuited.

Figure 12:
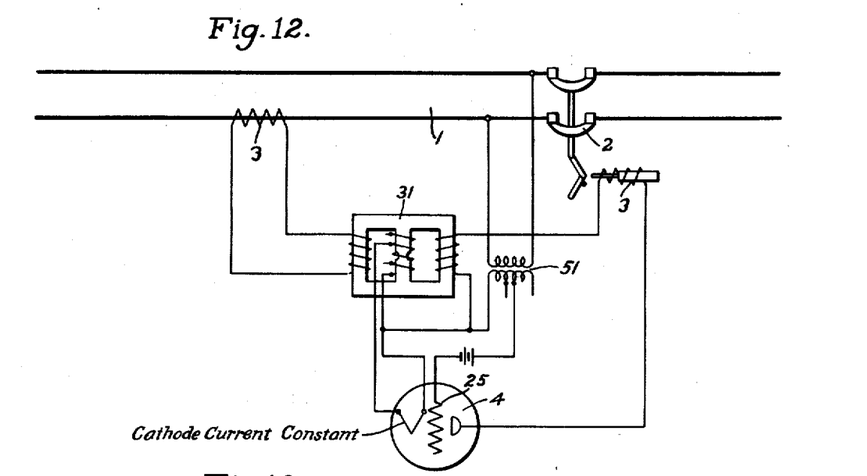
Figs. 12 and 13 are similar views of modifications of the systems shown in Figs. 9 to 11, embodying a three-electrode tube, and, Figs. 14 and 15 are similar views of current-differential systems embodying my invention.
Figure 13:
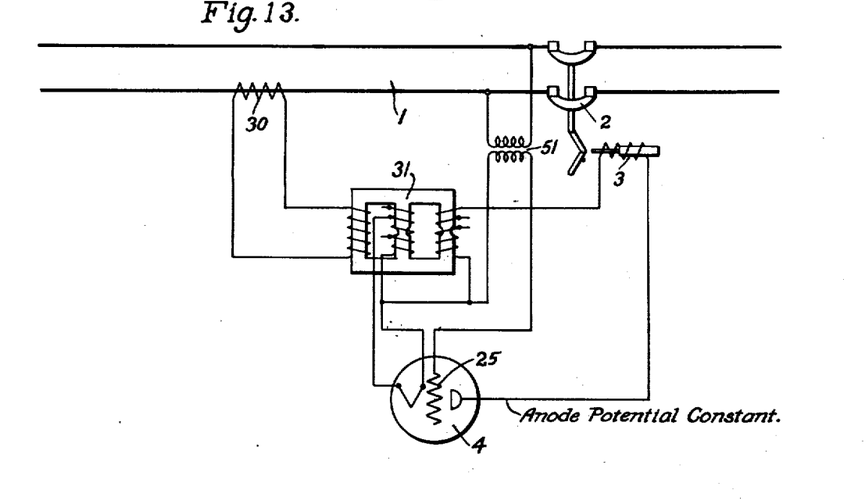

In Figs. 12 and 13 I have illustrated further modifications of the impedance system in which three-element electro-ionic tubes 4 are employed. In each of these systems the potential upon the grid electrode 25 of the electro-ionic tube depends upon the potential of the circuit 1 to which the tube is connected. In Fig. 12 the filament current and in Fig. 13, the plate potential is kept constant by saturating the respective magnetic circuit. In each of these modifications, the tube is operatively energized when the potential of the associated circuit drops to a sufficiently low value and the plate potential is sufficiently high. The relay can be made instantaneous in operation and will not operate if the fault is outside the section protected by the relay.

Figure 14:
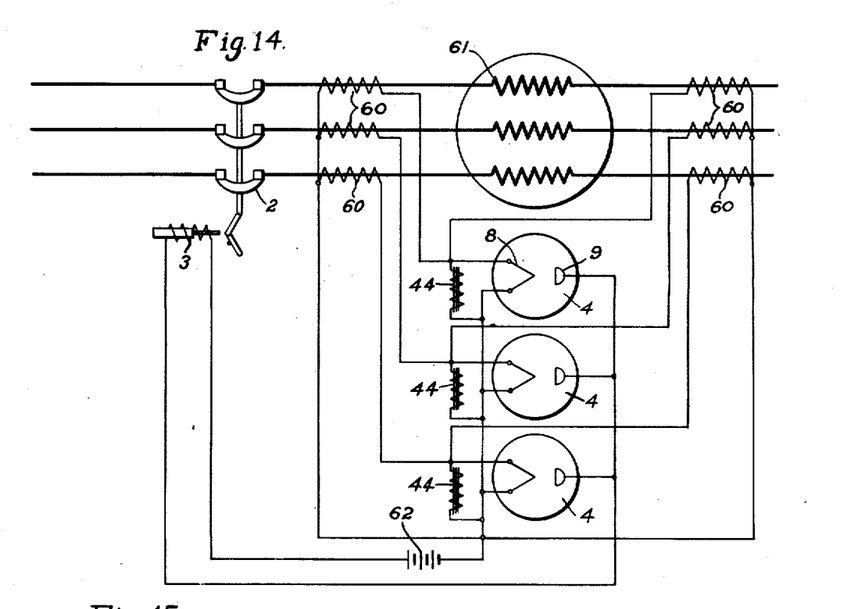
Figure 15:
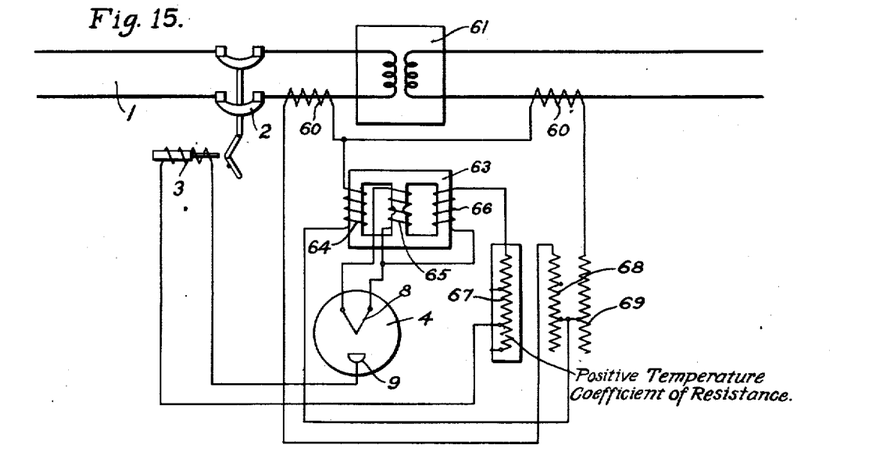

In Figs. 14 and 15 I have illustrated the application of my invention to differential protective systems. In Fig. 14 current transformers 60 are disposed in each phase of the circuit 1 on opposite sides of the translating device 61 to be protected. The filamentary cathodes 8 of the electro-ionic tubes 4 in each phase are connected across the differential or balanced circuit connecting the two current transformers 60 in the same phase on opposite sides of the translating device 61. The saturating reactor 44 may be connected across each cathode to prevent destruction of the cathode upon excessive currents. The anodes 9 of the several electro-ionic tubes are connected in parallel. The tripping coil 3 of the circuit-interrupter 2 is connected in the anode circuits in series relation to a source of current, such as a battery 62.

If a fault occurs in the translating device 61, the input current to the translating device 61 in one or more phases of the circuit varies in phase relation or magnitude from the output current. Consequently, a current traverses the cathode 8 of the electro-ionic tube 4, heating the same to the electron-emitting temperature, whereupon the tripping coil 3 is operatively energized to actuate the circuit-interrupter 2 and open the circuit.

In Fig. 15 the electro-ionic tube 4 is also controlled in accordance with a disturbance of the normal balance of the input and output currents to the translating device 61. An auxiliary transformer 63 is connected to the differential current transformers and serves to control the current in the cathode and anode circuits of the electro-ionic tube. The transformer 63 comprises three inductively related windings 64, 65 and 66. The winding 64 is so connected to the cumulatively wound current transformers 60 as to be energized in accordance with the unbalance between the currents traversing said transformers. The winding 65 is connected to the terminals of the cathode 8 of the electro-ionic tube. The winding 66 is connected in series with a resistor 67 having a relatively large positive temperature-coefficient of resistance and is in the anode circuit of the electro-ionic tube. Heaters 68 and 69 cooperating with the resistor 67 are so connected as to be heated in accordance with the currents traversing the respective current transformers 60. When the current traversing the circuit is relatively large, the heaters 68 and 69 maintain the resistor 67 at a temperature considerably above normal. Consequently, the unbalance in the circuit required to operate the circuit-interrupter under these conditions is greater than that required when the current traversing the circuit is small on account of the positive temperature-coefficient of resistance of the resistor 67. The differential protective scheme shown in this figure therefore possesses a "percentage" characteristic, as a larger unbalance is required to operate the circuit-interrupter when the load current is large than when it is relatively small.

While I have shown a number of modifications of my invention in order to disclose the nature of the invention more clearly and the application of its underlying principles to different types of protective systems, I do not consider that my invention is limited to precise embodiments which I have shown and described. Consequently, I desire that limitations shall not be placed upon the scope of my invention except as indicated in the appended claims.

I claim as my invention:

1. In a protective system, an electrical circuit, an electro-ionic tube energized therefrom, a variable-ratio energy-transferring means between the circuit and the tube and a thermal device operatively associated with said tube for predetermining the time-element characteristics of said tube.

2. In a protective system, an electrical circuit, an electro-ionic tube having cooperating electrodes, means for energizing said tube from the circuit, a resistor having a relatively large temperature-coefficient of resistance associated with said energizing means and connected to one of said electrodes and a heater associated with said resistor to control the responsiveness thereof.

3. A protective system for electrical circuits comprising an electro-ionic relay, means for controlling said relay upon the occurrence of a fault on the circuit in accordance with the impedance of the circuit between the relay and the fault and a device controlled by the relay.

4. A protective system for electrical circuits comprising an electro-ionic relay, time-element means for controlling said relay upon the occurrence of a fault on the circuit in accordance with the impedance of the circuit between the relay and the fault and a device controlled by the relay.

5. A protective system for electrical circuits comprising an electro-ionic relay energized therefrom means for controlling said relay in accordance with the direction of the flow of energy in said circuit, means for imparting a time-element to the operation of said relay and a device controlled by said relay.

6. A protective system for electrical circuits comprising an electro-ionic relay, means for controlling said relay in accordance with a disturbance between the normal ratio of currents at two points in the circuit and a device controlled by the relay.

7. A protective system for electrical circuits comprising an electro-ionic relay, means for controlling said relay in accordance with the percentage difference between the normal values of current at two points in the circuit and circuit-interrupting means in the circuit controlled by the relay.

8. In a protective system for an electric circuit having a circuit interrupter therein, the combination including a two-element electronic means electrically associated with said system and said circuit interrupter and additional means associated with said circuit and the electrical circuit of said electronic means for effecting a time-element in the operation of said electronic means.

9. In a protective system for an electric circuit having a circuit interrupter therein, the combination including a two-element electronic means energized from said circuit, means for effecting the actuation of said circuit interrupter in accordance with the energized condition of said electronic means and additional means electrically interposed between said electronic means and said circuit for imparting a predetermined time-delay in the operation of said electronic means.

10. In an electric circuit having a circuit interrupter therein, protective means including in combination a two-element electronic means, means associated with said circuit and said electronic means for effecting the energization thereof in accordance with an electrical quantity in said circuit, means for effecting the actuation of said circuit interrupter in accordance with the energized condition of said electronic means and additional means having a temperature coefficient of resistance interposed between said electronic means and said circuit for effecting a predetermined time-delay in the operation of said electronic means.

11. In an alternating-current system having a circuit interrupter therein, protective means therefor including electronic means electrically associated with said system and said interrupter and means for effecting the energization of said electronic means in accordance with more than one electrical quantity in said system.

12. In an alternating-current protective system having a circuit interrupter therein, in combination, electronic means electrically associated with said system and said interrupter and means associated with said system and said electronic means for effecting the energization of said electronic means in accordance with the system current and voltage.

13. In an alternating-current protective system, the combination including electronic means, and means associated with said system and said electronic means for effecting the energization of said electronic means in accordance with the impedance of said system.

14. In an alternating-current system, electronic means electrically associated therewith, and means energized in accordance with more than one electrical quantity in said system for controlling the effective energization of said electronic means.

15. In an alternating-current protective system having a circuit interrupter therein, an electronic impedance relay means, means associated with said circuit and said relay means for effecting the energization of said relay means in accordance with the current and voltage in said system and means controlled in accordance with a predetermined energization of said relay means for effecting the actuation of said circuit interrupter.

16. In an alternating-current system having a circuit interrupter therein, protective means therefor including in combination an electronic means, means associated with said system and said electronic means for effecting the energization of said electronic means in accordance with more than one electrical quantity in said system and means responsive to the operative energization of said electronic means for effecting the actuation of said circuit interrupter upon the occurrence of a predetermined fault or abnormal system condition.

17. In an alternating-current protective system having a circuit interrupter therein, the combination including electronic relay means, means associated with said system and said relay means for energizing said relay means in accordance with the current and voltage of said system, and means controlled by a predetermined energization of said relay means for effecting the actuation of said circuit interrupter in accordance with the system impedance between said first means and a point in said system where an abnormal electrical condition exists.

18. In a means for providing impedance protection for an alternating-current system, the combination including electronic means electrically associated with said system and said circuit interrupter and means interposed between said system and said electronic means for effecting the energization of said electronic means in accordance with the system current and voltage.

19. In a protective system for an electrical circuit, electronic means energized from said circuit, means for controlling the effective energization of said electronic means in accordance with the direction of energy flow in said circuit, means for imparting a time-element to the operation of said electronic means and means controlled by said electronic means in accordance with a predetermined magnitude of energization of said electronic means.

20. A protective arrangement for an electric system including transforming means, one at each of two points of the system connected to be energized in accordance with the currents at the points, electronic means having a circuit including the secondaries of the transformers and so connected and arranged as to energize the electronic means in accordance with the difference between the currents at the two points of the system, and means energized in accordance with a predetermined energization of said electronic means.

21. A protective arrangement for an electric system including transforming means, one at each of two points of the system connected to be energized therefrom, the secondaries of the transformers being connected in a circuit to produce an effect dependent on the difference between their energizations, electron discharge means connected and arranged to be controlled in accordance with such effect, and electroresponsive means arranged to be controlled by the electron discharge means.

In testimony whereof, I have hereunto subscribed my name this 21st day of July, 1926.

JOHN V. BREISKY.

DISCLAIMER 1,872,560.—*John V. Breisky*, Pittsburgh, Pa. ELECTRICAL PROTECTIVE SYSTEM. Patent dated August 16, 1932. Disclaimer filed September 22, 1934, by the patentee, the assignee, *Westinghouse Electric & Manufacturing Company*, consenting.

Hereby disclaims the subject matter of claims, 5, 11, 12, 14, 15, 16, and 19 of said patent, to wit:

"5. A protective system for electrical circuits comprising an electro-ionic relay energized therefrom, means for controlling said relay in accordance with the direction of the flow of energy in said circuit, means for imparting a time-element to the operation of said relay and a device controlled by said relay."

"11. In an alternating-current system having a circuit interrupter therein, protective means therefor including electronic means electrically associated with said system and said interrupter and means for effecting the energization of said electronic means in accordance with more than one electrical quantity in said system.

"12. In an alternating-current protective system having a circuit interrupter therein, in combination, electronic means electrically associated with said system and said interrupter and means associated with said system and said electronic means for effecting the energization of said electronic means in accordance with the system current and voltage."

"14. In an alternating-current system, electronic means electrically associated therewith, and means energized in accordance with more than one electrical quantity in said system for controlling the effective energization of said electronic means.

"15. In an alternating-current protective system having a circuit interrupter therein, an electronic impedance relay means, means associated with said circuit and said relay means for effecting the energization of said relay means in accordance with the current and voltage in said system and means controlled in accordance with a predetermined energization of said relay means for effecting the actuation of said circuit interrupter.

"16. In an alternating-current system having a circuit interrupter therein, protective means therefor including in combination an electronic means, means associated with said system and said electronic means for effecting the energization of said electronic means in accordance with more than one electrical quantity in said system and means responsive to the operative energization of said electronic means for effecting the actuation of said circuit interrupter upon the occurrence of a predetermined fault or abnormal system condition."

"19. In a protective system for an electrical circuit, electronic means energized from said circuit, means for controlling the effective energization of said electronic means in accordance with the direction of energy flow in said circuit, means for imparting a time-element to the operation of said electronic means and means controlled by said electronic means in accordance with predetermined magnitude of energization of said electronic means."

[*Official Gazette October 23, 1934.*]